(12) United States Patent
Akatsuka et al.

(10) Patent No.: US 9,341,875 B2
(45) Date of Patent: May 17, 2016

(54) ELECTRONIC DEVICE

(75) Inventors: Hiroki Akatsuka, Tokyo (JP); Takao Kuroki, Kawabe-gun (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/366,241

(22) PCT Filed: Mar. 23, 2012

(86) PCT No.: PCT/JP2012/002037
§ 371 (c)(1),
(2), (4) Date: Jun. 17, 2014

(87) PCT Pub. No.: WO2013/140463
PCT Pub. Date: Sep. 26, 2013

(65) Prior Publication Data
US 2015/0022753 A1 Jan. 22, 2015

(51) Int. Cl.
*G02F 1/1333* (2006.01)
*G02F 1/1335* (2006.01)

(52) U.S. Cl.
CPC ........ *G02F 1/133308* (2013.01); *G02F 1/1336* (2013.01); *G02F 1/133524* (2013.01); *G02F 2001/133317* (2013.01); *G02F 2001/133331* (2013.01); *G02F 2201/46* (2013.01); *G02F 2201/50* (2013.01)

(58) Field of Classification Search
CPC ............ G02F 1/133308; G02F 1/133615; G02F 1/1336; G02F 1/133524; G02F 1/133608; G02F 1/1333; G02F 2001/133314; G02F 2001/133317; G02F 2001/13332; G02F 2001/133325; G02F 2001/133331; G02F 2201/46; G02F 2201/50; G02B 6/0085; G02B 6/0088; G02B 6/0073; G02B 6/0091; G02B 6/0093; G02B 6/0011
USPC ............ 349/58, 65, 60, 61, 12; 362/611, 613, 362/612, 97.1, 382; 348/794, 790, 836
See application file for complete search history.

(56) References Cited

U.S. PATENT DOCUMENTS

| 2007/0079537 | A1 | 4/2007 | Lee |
| 2009/0011197 | A1 | 1/2009 | Matsuhira |
| 2014/0362328 | A1* | 12/2014 | Kuroki ............. G02F 1/133308 349/58 |

FOREIGN PATENT DOCUMENTS

| JP | 8-190085 A | 7/1996 |
| JP | 2003-5658 A | 1/2003 |
| JP | 2007-94408 A | 4/2007 |
| JP | 2008-111984 A | 5/2008 |
| JP | 2009-8703 A | 1/2009 |
| JP | 2009-145760 A | 7/2009 |
| JP | 2011-75605 A | 4/2011 |
| WO | WO 2013/157038 | * 10/2013 ................ G09F 9/00 |

* cited by examiner

*Primary Examiner* — Thoi Duong
(74) *Attorney, Agent, or Firm* — Birch, Stewart, Kolasch & Birch, LLP

(57) ABSTRACT

A mold frame 5 includes a flange part 5*b* that is formed to expand outward on a peripheral edge of a frame opening, and that holds an outer peripheral part 3*b* of a protection plate 3 from a rear surface side thereof.

5 Claims, 5 Drawing Sheets

ELECTRONIC DEVICE

TECHNICAL FIELD

The present invention relates to an electronic device that has a display unit with protection plate such as liquid crystal display device.

BACKGROUND ART

In an electronic device such as liquid crystal display device, with a view to protecting the device from external impact or improving design and optical property thereof, a protection plate is bonded to an upper surface of a display panel. Note that the protection plate is a transparent plate member that is frame printed on a portion corresponding to an outer periphery of a display screen of the display panel.

As conventional electronic devices that include a display panel having a protection plate, there are electronic devices disclosed in Patent Documents 1 and 2, for example.

The electronic device described in Patent Document 1 does not have a special structure that holds a protection plate which is stuck to a display panel at the time of installing the display panel in a device main body.

On the other hand, the electronic device described in Patent Document 2 includes a design housing case having an opening part for installing a display panel, and a step part formed to expand inward on a peripheral edge of the opening part, and the display panel is held such that an outer peripheral part of a protection plate stuck thereto is bonded to the step part.

PRIOR ART DOCUMENTS

Patent Documents

Patent Document 1: Japanese Unexamined Patent Application Publication No. 2009-8703
Patent Document 2: Japanese Unexamined Patent Application Publication No. 2008-111984

SUMMARY OF THE INVENTION

Problems to be Solved by the Invention

According to the conventional technique represented by Patent Document 1, because the electronic device does not have a structure that holds the protection plate which is stuck to the display panel at the time of installing the display panel in the device main body, the outer peripheral part of the protection plate inevitably has shortage of strength to bear a load from outside. For example, when the protection plate is deformed due to a load of a touch operation, there is a possibility of occurrence of display unevenness thereof.

On the other hand, according to the conventional technique represented by Patent Document 2, the outer peripheral part of the protection plate is bonded to the step part of the design housing case, so that strength thereof is secured; however, with all the design housing case that directly receives external impact, even if the case is damaged, a rework therefor is difficult.

The present invention is made to solve the foregoing problems, and an object of the invention is to obtain an electronic device capable of securing rigidity of the protection plate without lowering reworkability of the device.

Means for Solving the Problems

The electronic device according to the present invention includes: a holding housing having a case with one side opened to accommodate a light guide body, and a frame which has a first flange part formed to expand inward on a peripheral edge of a frame opening and which is attached to an opening of the case to hold the light guide body between the first flange part and the case; a liquid crystal display panel having an outer peripheral part fixed to the first flange part of the frame, and having a backside illuminated by light from a light source guided by the light guide body; and a protection plate attached to a display surface side of the liquid crystal display panel, and the frame includes a second flange part formed to expand outward on a peripheral edge of the frame opening to hold an outer peripheral part of the protection plate from a rear surface side thereof.

Effect of the Invention

According to the present invention, there is an advantageous effect such that rigidity of the protection plate can be secured without lowering reworkability of the device.

BEST MODE FOR CARRYING OUT THE INVENTION

Figure 1:
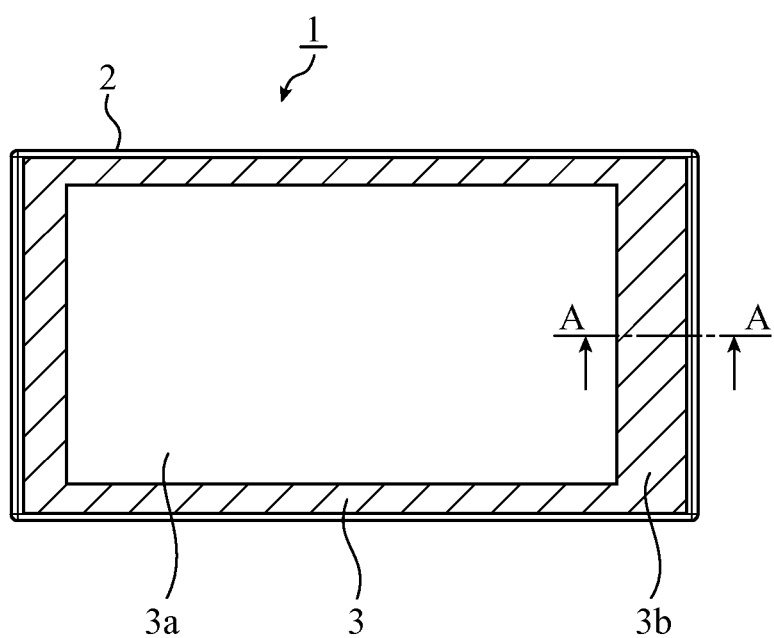
FIG. 1 is a front view showing an electronic device that has a display unit with protection plate.
Figure 2:
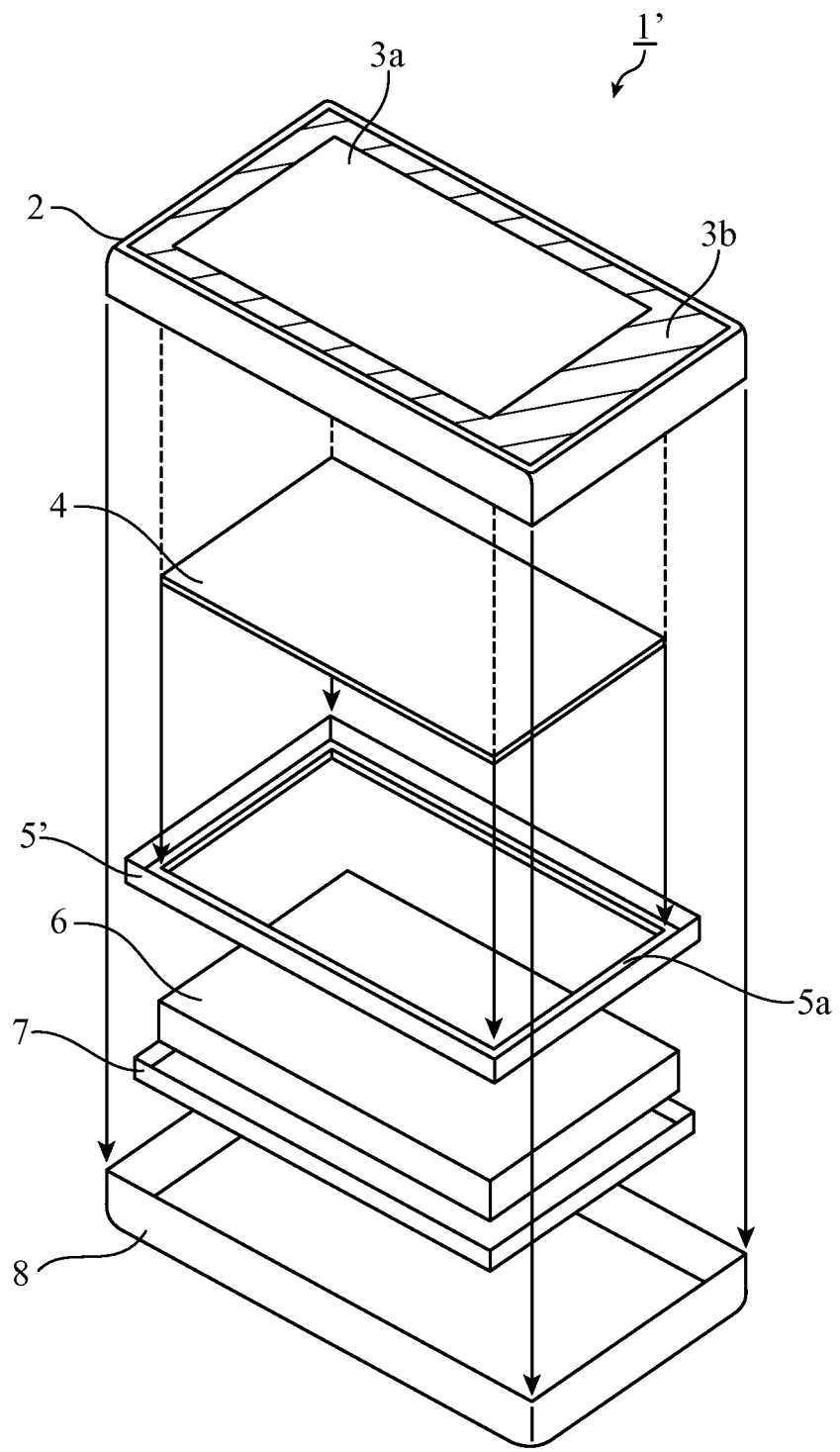
FIG. 2 is an exploded perspective view showing a configuration of a conventional electronic device.

In the following, in order to describe the present invention in more detail, embodiments for carrying out the invention will be described with reference to the attached drawings.
Embodiment 1.
FIG. 1 is a front view showing an electronic device that has a display unit with protection plate. An electronic device 1 shown in FIG. 1 is a portable electronic device such as a smartphone or a PND (Portable Navigation Device) equipped with a liquid crystal display unit. A display surface side case 2 of the electronic device 1 is attached with a protection plate 3 for protecting a liquid crystal display panel. In the protection plate 3, formed are a region corresponding to a display screen 3a, and a frame-shaped region 3b around the display screen 3a in which a rear surface thereof is printed with a light non-transmissive color.
FIG. 2 is an exploded perspective view showing a configuration of a conventional electronic device, and schematically shows a conventional general configuration of the portable electronic device shown in FIG. 1. A conventional portable electronic device 1' includes the display surface side case 2, a liquid crystal display panel 4, a backlight holding frame 5', a light guide plate 6, a backlight holding case 7, and a rear surface side case 8, as shown in FIG. 2.

The display surface side case 2 is a frame-shaped design housing that configures a housing at a display surface side of the electronic device 1', and the protection plate 3 to be attached to a display surface side of the liquid crystal display panel 4 is arranged thereon. The display surface side case 2 and the rear surface side case 8 serve as a housing main body of the electronic device 1'.

The protection plate 3 is a panel-shaped member that is formed of a transparent material and that protects a display surface of the liquid crystal display panel 4 from outside. In the protection plate 3, the periphery of the display screen 3a is provided by a frame-shaped region 3b in which a rear surface thereof is printed with a non-translucent color (for example, a black color) in a frame shape.

The liquid crystal display panel 4 is configured with: an electrode structure in which a liquid crystal layer is sandwiched between respective transparent substrates at the display surface side and the rear surface side to apply an electric field to the liquid crystal layer; a color filter; a polarizing plate; and the like, and displays an image owing to a backlight irradiated from the rear surface side. Additionally, the liquid crystal display panel 4 has the display surface side bonded to the protection plate 3 with a transparent adhesive sheet, and has an outer peripheral part of the rear surface side to be fixed by adhesion to a flange part 5a of the backlight holding frame 5'.

The backlight holding frame 5' is the frame that has the flange part 5a formed to expand inward on a peripheral edge of a frame opening. Also, the light guide plate 6 irradiates light emitted from a backlight light source (not shown in FIG. 2) such as an LED to the rear surface of the liquid crystal display panel 4 as diffusion light. The backlight holding case 7 has the case with one side opened to accommodate an illumination light source part including the light guide plate 6.

When the backlight holding frame 5' is attached to the opening part of the backlight holding case 7, the flange part 5a and the backlight holding case 7 hold the light guide plate 6 by sandwiching the light guide plate 6. Note that a illumination light source part (not shown except the light guide plate 6) that includes the light guide plate 6, various optical sheets, a light source, and the like is accommodated in a holding housing consisting of the backlight holding frame 5' and the backlight holding case 7.

Figure 3:
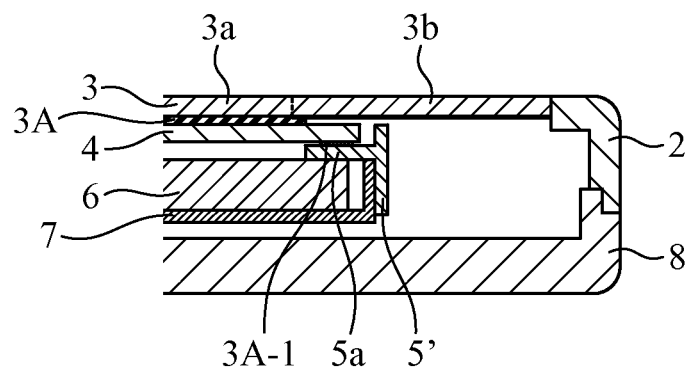
FIG. 3 is a cross-sectional view showing a configuration of the conventional electronic device.

FIG. 3 is a cross-sectional view showing the configuration of the conventional electronic device and viewing from an arrow direction, and shows a cross section in the arrow direction of the conventional electronic device taken along a line A-A in FIG. 1. In FIG. 3, in a housing main body consisting of the display surface side case 2 and the rear surface side case 8, the liquid crystal display panel 4 to which the protection plate 3 is attached with a transparent adhesive sheet 3A is arranged on the display surface side, and the holding housing consisting of the backlight holding frame 5' that accommodates the light guide plate 6 and the backlight holding case 7 is arranged on the rear surface side of the liquid crystal display panel 4. Additionally, an outer peripheral part on the rear surface side of the liquid crystal display panel 4 is fixed by adhesion to the flange part 5a with a fixing tape 3A-1.

The conventional electronic device 1' shown in FIG. 3 does not have a special structure that holds the protection plate 3 at the time of installing the liquid crystal display panel 4 on a device main body as in Patent Document 1. Specifically, when a predetermined load or greater is applied from the front surface side of the protection plate 3 to its outer peripheral part (frame-shaped region 3b), the protection plate 3 is deformed, and hence there is a possibility of occurrence of display unevenness thereof.

Figure 4:
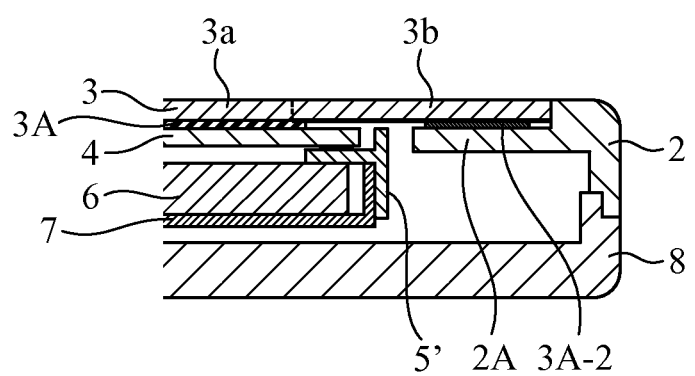
FIG. 4 is a cross-sectional view showing another configuration of the conventional electronic device.

FIG. 4 is a cross-sectional view showing another configuration of the conventional electronic device and viewing from the arrow direction, and shows a cross section in the arrow direction of the conventional electronic device taken along the line A-A in FIG. 1, similarly to that of FIG. 3. In the conventional electronic device 1' shown FIG. 4, the outer peripheral part on the rear surface of the protection plate 3 is fixed by adhesion to a step part 2A that is formed on the display surface side case 2 with a fixing tape 3A-2.

Specifically, according to this electronic device 1', as in Patent Document 2, at the time of installing the liquid crystal display panel 4 in the device main body, the outer peripheral part of the protection plate 3 is held from the rear surface by the step part 2A of the display surface side case 2. In this configuration, the strength of the protection plate 3 against a load from outside can be secured, but when the display surface side case 2 is damaged, the protection plate 3 is still adhered thereto, and thus a rework thereon is difficult.

Therefore, in place of the backlight holding frame 5', the present invention employs a mold frame in which a flange part that holds the outer peripheral part of the protection plate 3 from the rear surface side is formed. With such a configuration, rigidity of the protection plate 3 can be secured without lowering reworkability of the device.

Figure 5:
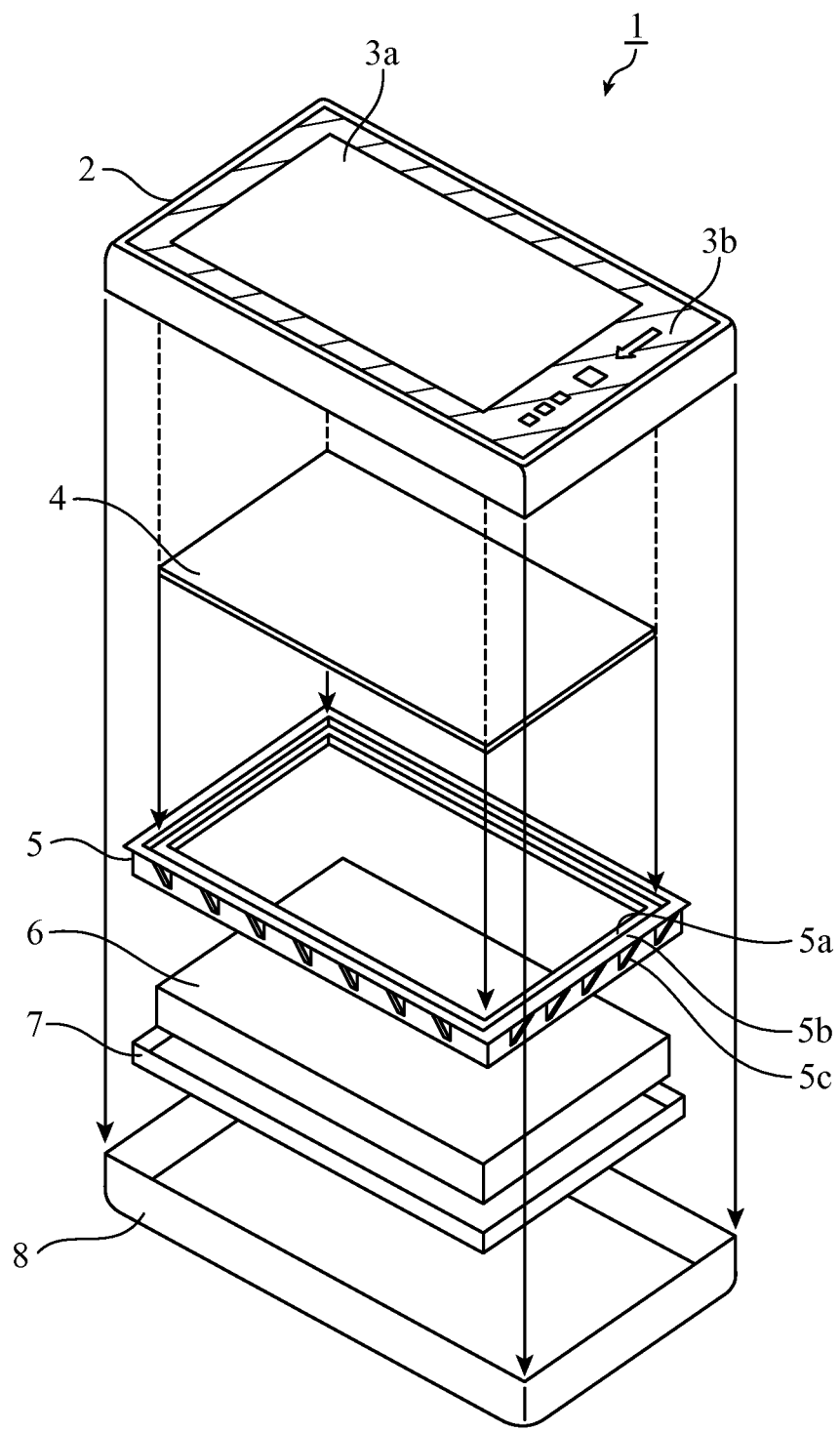
FIG. 5 is an exploded perspective view showing a configuration of an electronic device according to Embodiment 1 of the present invention.
Figure 6:
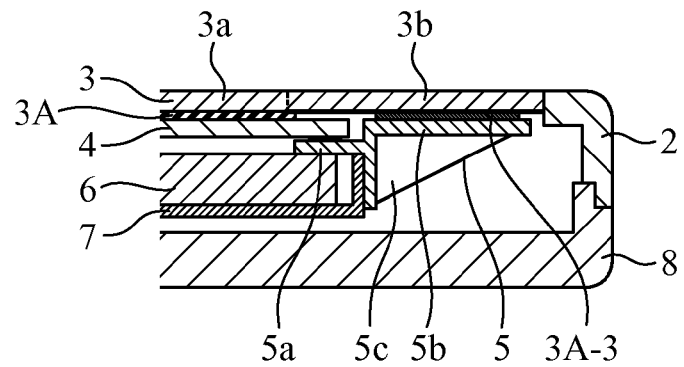
FIG. 6 is a cross-sectional view showing a holding structure of a protection plate in the electronic device according to Embodiment 1.

FIG. 5 is an exploded perspective view showing a configuration of an electronic device according to Embodiment 1 of the present invention, and shows schematically the configuration of the electronic device according to Embodiment 1. FIG. 6 is a cross-sectional view showing a holding structure of a protection plate of the electronic device according to Embodiment 1, and shows a cross section of the electronic device of FIG. 5 taken along the arrow direction of the line A-A in FIG. 1. The electronic device 1 shown in FIG. 5 includes the display surface side case 2, the liquid crystal display panel 4, a mold frame 5, the light guide plate 6, the backlight holding case 7, and the rear surface side case 8. The components other than the mold frame 5 are similar to those in FIG. 2.

The mold frame 5 includes a flange part 5b that is expanded outward on the peripheral edge of the frame opening, in addition to the flange part 5a for holding the light guide plate 6 and installing the liquid crystal display panel 4.

By attaching the mold frame 5 to the opening part of the backlight holding case 7, similarly to the conventional, the flange part 5a and the backlight holding case 7 hold the light guide plate 6 by sandwiching the light guide plate 6. Further, the flange part 5b has a shape expanded outward on the peripheral edge of the frame opening along the frame-shaped region 3b of the protection plate 3, and holds from the rear surface the outer peripheral part of the protection plate 3 with stuck to the frame-shaped region 3b with the fixing tape 3A-2.

With such a configuration, even though the liquid crystal display panel 4 is stuck thereto and thus a weight applied to the protection plate 3 is increased, a holding force for holding the protection plate 3 can be enhanced by bonding the flange part 5b of the mold frame 5 to the rear surface of the outer peripheral part of the protection plate 3 without adding a new part.

In addition, rigidity of the outer peripheral part (frame-shaped region 3b) of the protection plate 3 can be increased by the flange part 5b, and display unevenness due to deformation of the protection plate 3 that receives an external force can also be prevented.

Because the flange part 5b is stuck to the outer peripheral part of the protection plate 3, dust entering from a gap between the frame-shaped region 3b of the protection plate 3 and the display surface side case 2 can be prevented from flowing in the liquid crystal display panel 4 side.

Further, in the present invention, no modification is added to the display surface side case 2 and the rear surface side case 8; thus, even when a damage occurs in the display surface side case 2 or the rear surface side case 8, a rework thereon can be performed easily.

As shown in FIG. 5 and FIG. 6, a reinforcing rib 5c for reinforcing the flange part 5b may be provided in the mold frame 5. In this case, the reinforcing rib 5c is provided over a side face of the mold frame 5 and a face of the flange part 5b on an opposite side (rear surface side) to a face to be adhered to the protection plate 3. A material with rigidity is used for the reinforcing rib 5c. For example, at the time of molding the mold frame 5, the reinforcing rib 5c is formed by inserting a metal member thereinto. In this way, rigidity of the protection plate 3 can be improved by increasing rigidity of the flange part 5b.

Furthermore, by using a configuration in which the mold frame 5 is a constituent member of the holding housing that holds the light guide plate 6, leakage of light from the light guide plate 6 may be shielded (shaded) by the flange part 5b.

Figure 7:
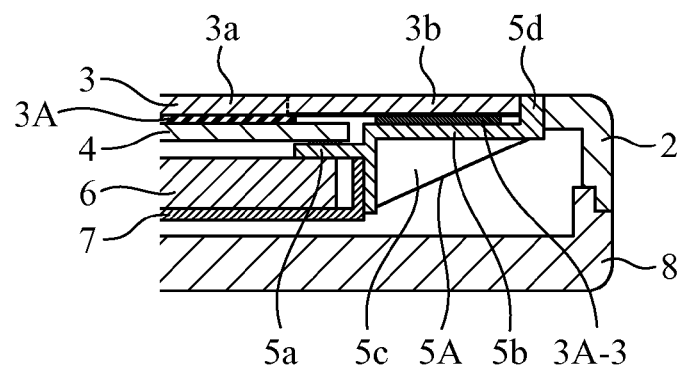
FIG. 7 is a cross-sectional view showing another holding structure in the protection plate of the electronic device according to Embodiment 1.

FIG. 7 is a cross-sectional view showing a holding structure of the protection plate in the electronic device according to Embodiment 1, and shows a cross section in the arrow direction taken along the line A-A in FIG. 1 of the electronic device having the light shielding flange part 5b. In FIG. 7, a mold frame 5A is formed of a light non-transmissive member such as a black resin, and the flange part 5b is stuck to the frame-shaped region 3b (rear surface printed black region) of the protection plate 3 with the fixing tape 3A-2. With such a configuration, light irradiated from the light guide plate 6 to the liquid crystal display panel 4 can be prevented from leaking from the gap between the frame-shaped region 3b of the protection plate 3 and the display surface side case 2.

Further, as shown in FIG. 7, a light shielding wall part 5d that shields light from a side face of the protection plate 3 may be provided in the flange part 5b. When the light shielding wall part 5d is interposed between the side face of the protection plate 3 and an end face on the protection plate 3 side of the opening part of the display surface side case 2, light transmitted from the light guide plate 6 through the inside of the protection plate 3 is shielded. Accordingly, leakage of unnecessary light from the side surface of the protection plate 3 can be prevented.

Meanwhile, the protection plate 3 is usually formed with printed in a frame shape on the outer periphery of a glass or flat panel member, and a specific positioning shape cannot be provided between the protection plate 3 and the display surface side case 2. Thus, in the present invention, a positioning structure may be provided at the flange part 5b.

Figure 8:
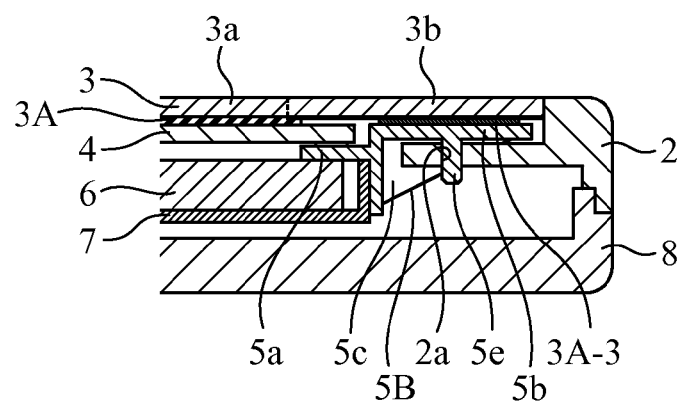
FIG. 8 is a cross-sectional view showing still another holding structure in the protection plate of the electronic device according to Embodiment 1.

FIG. 8 is a cross-sectional view showing a holding structure of the protection plate in the electronic device according to Embodiment 1, and shows a cross section in the arrow direction of the electronic device that has the positioning structure taken along the line A-A in FIG. 1. A mold frame 5B shown in FIG. 8 has a positioning boss 5e that is formed on the rear surface of the flange part 5b. In addition, a plate-shaped member is formed to expand inward in the opening part of the display surface side case 2, and a positioning hole part 2a is formed in advance in the plate-shaped member.

The positioning boss 5e of the flange part 5b is fitted into the positioning hole part 2a that is provided on the display surface side case 2 with the holding housing installed on the display surface side case 2, so that the holding housing is positioned to the display surface side case 2. As a result, an approximately uniform gap is formed between the rear surface of the outer peripheral part of the protection plate 3 and the plate-shaped member of the display surface side case 2, and appearance of the protection plate 3 to the opening part of the display surface side case 2 can be set uniform.

As described above, according to Embodiment 1, the mold frame 5 includes the flange part 5b that is formed to expand outward on the peripheral edge of the frame opening, and that holds the outer peripheral part 3b of the protection plate 3 from the rear surface side thereof, and thus rigidity of the protection plate 3 can be secured without lowering reworkability of the device. Further, the holding force for holding the protection plate 3 can be improved.

In addition, according to Embodiment 1, because the reinforcing rib 5c that reinforces the flange part 5b is included, rigidity of the protection plate 3 can be improved.

Further, according to Embodiment 1, because the mold frame 5 is formed of the light non-transmissive member, leakage of light from the light guide plate 6 to the liquid crystal display panel 4 can be prevented.

Furthermore, according to Embodiment 1, because the flange part 5b includes the light shielding wall part 5d that shields leakage light from the side surface of the protection plate 3, leakage of unnecessary light from the side surface of the protection plate 3 can be prevented.

Moreover, according to Embodiment 1, because the flange part 5b includes the positioning boss 5e for positioning the holding housing to the display surface side case 2 by fitting the positioning boss 5e into the positioning hole part 2a that is provided on the display surface side case 2 with the holding housing installed in the display surface side case 2, positioning of the protection plate 3 to the display surface side case 2 can be performed easily.

It is noted that in the present invention, a modification of arbitrary components in the embodiment or an omission of arbitrary components in the embodiment is possible within a range of the invention.

INDUSTRIAL APPLICABILITY

Since rigidity of the protection plate can be secured without lowering reworkability of the device, the electronic device according to the present invention is suitable for a display device at a portable terminal equipped with a touch panel.

DESCRIPTION OF REFERENCE NUMERALS AND SIGNS 1, 1' Electronic device, 2 Display surface side case, 2A Step part, 2a Positioning hole part, 3 Protection plate, 3a Display screen, 3b Frame-shaped region, 3A Transparent adhesive sheet, 3A-1, 3A-2 Fixing tape, 4 Liquid crystal display panel, 5, 5A, 5B Mold frame, 5' Backlight holding frame, 5a, 5b Flange part, 5c Reinforcing rib, 5d Light shielding wall part, 5e Positioning boss, 6 Light guide plate, 7 Backlight holding case, 8 Rear surface side case.

The invention claimed is:

1. An electronic device comprising:
   a holding housing having a case with one side opened to accommodate an illumination light source including a light guide body, and a frame which has a first flange part formed to expand inward on a peripheral edge of a frame opening and which is attached to an opening of the case to hold the light guide body between the first flange part and the case;

a liquid crystal display panel having an outer peripheral part fixed to the first flange part of the frame, and having a backside illuminated by light from a light source guided by the light guide body; and a protection plate attached to a display surface side of the liquid crystal display panel, wherein the frame includes a second flange part formed to expand outward on a peripheral edge of the frame opening to hold an outer peripheral part of the protection plate from a rear surface side thereof.

2. The electronic device according to claim 1, comprising a reinforcing rib that reinforces the second flange part.

3. The electronic device according to claim 1, wherein the frame is formed of a light non-transmissive member.

4. The electronic device according to claim 3, wherein the second flange part comprises a light shielding wall that shields leakage light from a side face of the protection plate.

5. The electronic device according to claim 1, wherein the second flange part comprises a positioning engagement part that positions the holding housing to a housing main body of the holding housing by engaging the holding housing with an engagement part provided in the housing main body with the holding housing installed in the housing main body.

* * * * *